(12) United States Patent
Grover

(10) Patent No.: US 11,882,322 B2
(45) Date of Patent: Jan. 23, 2024

(54) MANAGING CONTENT REPLACEMENT IN A CONTENT MODIFICATION SYSTEM

(71) Applicant: ROKU, INC., San Jose, CA (US)

(72) Inventor: Matthew George Grover, San Jose, CA (US)

(73) Assignee: Roku, Inc., San Jose, CA (US)

(*) Notice: Subject to any disclaimer, the term of this patent is extended or adjusted under 35 U.S.C. 154(b) by 0 days.

(21) Appl. No.: 17/742,920

(22) Filed: May 12, 2022

(65) Prior Publication Data

US 2023/0370654 A1 Nov. 16, 2023

(51) Int. Cl.
| | |
|---|---|
| *H04N 21/234* | (2011.01) |
| *H04N 21/2343* | (2011.01) |
| *H04N 21/81* | (2011.01) |
| *H04N 21/845* | (2011.01) |
| *H04N 21/235* | (2011.01) |

(52) U.S. Cl.
CPC ... *H04N 21/23424* (2013.01); *H04N 21/2353* (2013.01); *H04N 21/234345* (2013.01); *H04N 21/812* (2013.01); *H04N 21/8455* (2013.01)

(58) Field of Classification Search
None
See application file for complete search history.

(56) References Cited

U.S. PATENT DOCUMENTS

| | | | | |
|---|---|---|---|---|
| 5,534,937 | A * | 7/1996 | Zhu | H04N 19/40 375/E7.277 |
| 6,975,363 | B1 * | 12/2005 | Baldwin | H04N 21/42676 375/E7.278 |
| 2012/0030769 | A1 * | 2/2012 | De Laet | H04N 21/4425 726/26 |
| 2018/0035174 | A1 * | 2/2018 | Littlejohn | H04N 21/858 |
| 2020/0045358 | A1 * | 2/2020 | Modi | G01C 21/3664 |
| 2020/0059691 | A1 * | 2/2020 | Seo | H04N 21/2668 |

* cited by examiner

*Primary Examiner* — Jason K Lin
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for managing content replacement in a content modification system, which can be applicable to dynamic advertisement insertion. A media device can provide a first segment of a linear sequence of content segments to a display device. The first segment can include an ending frame adjacent to a start frame of a second segment of the linear sequence of content segments, where the second segment is to be replaced by a replacement segment. Based on a determination that the replacement segment is unavailable, the media device can provide one or more additional copies of the ending frame of the first segment to the display device while the replacement segment to replace the second segment is unavailable.

20 Claims, 6 Drawing Sheets

MANAGING CONTENT REPLACEMENT IN A CONTENT MODIFICATION SYSTEM

FIELD

This disclosure is generally directed to managing content replacement in a content modification system, and more particularly to dynamic advertisement insertion (DAI) that allows advertisers using a content modification system to swap out advertisements in linear, live, video-on-demand, or streaming content.

BACKGROUND

Television (TV) offers viewers access to content via subscription to cable or satellite services or through over-the-air broadcasts. In general, content, such as multimedia content, can be delivered from a content source device operated by a content provider to millions of viewers. TV content has been offered to viewers in a linear way in which viewers consume the content and watch programs according to a broadcaster programming schedule. If viewers want to watch their selected content, they have to tune in to a specific TV channel at a specific time. Over-the-top television (OTT) refers to TV content delivered via the internet in a live streaming format without the involvement of cable or satellite service providers. Dynamic advertisement insertion (DAI) can allow advertisers using a content modification system to swap out advertisements in linear, live, video-on-demand, or streaming content, either in the traditional TV, OTT, or content delivered in any other format. However, challenges remain in improving the quality of the content replacement in a content modification system.

SUMMARY

Provided herein are system, apparatus, article of manufacture, method and/or computer program product embodiments, and/or combinations and sub-combinations thereof, for managing content replacement in a content modification system. Techniques presented herein can be applicable to dynamic advertisement insertion (DAI) that allows advertisers using a content modification system to swap out advertisements in linear, live, video-on-demand, or streaming content. The content can be represented by a linear sequence of content segments, where an advertisement can be one segment of the linear sequence of content segments, and the replacement advertisement can be a replacement segment.

An example embodiment of a computing device includes a storage device and a controller coupled to the storage device. The storage device can store a replacement segment. The controller can be configured to provide a first segment of a linear sequence of content segments to a display device. The linear sequence of content segments can be a streaming media program on a channel, or any content delivered as a linear TV program, an over-the-top television (OTT) program, or other streaming content. The first segment can include an ending frame adjacent to a start frame of a second segment of the linear sequence of content segments. The replacement segment is used to replace the second segment of the linear sequence of content segments. Based on a determination that the replacement segment is unavailable, the controller can be configured to provide one or more additional copies of the ending frame of the first segment to the display device while the replacement segment to replace the second segment is unavailable. In some embodiments, the controller can be configured to provide the one or more additional copies of the ending frame to the display device until a determination that the replacement segment is available. Once the replacement segment becomes available, the controller can be configured to provide the replacement segment to the display device. In some embodiments, the second segment is an original advertisement segment, and the replacement segment is a replacement advertisement segment received from an advertisement server and stored in the storage device.

In addition, the linear sequence of content segments can include a subsequent segment adjacent to and after the second segment, and the controller is further configured to provide the subsequent segment to the display device after providing the replacement segment to the display device. In some embodiments, upon a determination that the replacement segment is not available after a predetermined time period, the controller can be further configured to provide a segment of the linear sequence of content segments to the display device, wherein the segment is separated from the first segment by the predetermined time period.

In some embodiments, the controller can be configured to detect that the second segment is to be replaced by the replacement segment before detecting whether the replacement segment is available in the storage device to replace the second segment. The controller can detect that the second segment is to be replaced by the replacement segment based on metadata associated with the linear sequence of content segments generated by an automatic content recognition (ACR) server. The controller can be further configured to perform fingerprint of the linear sequence of content segments by the ACR server while providing the one or more additional copies of the ending frame of the first segment to the display device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
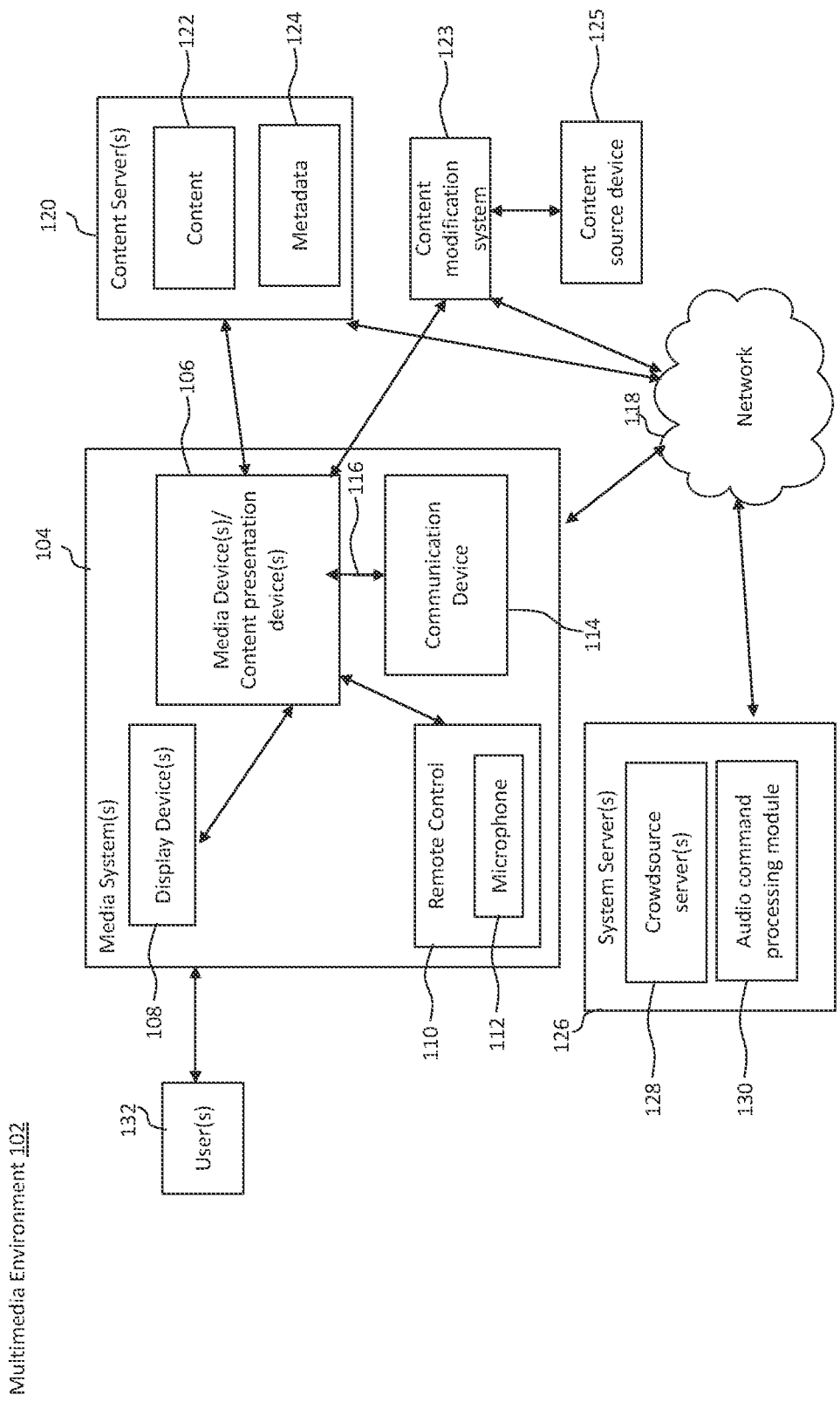
FIG. 1 illustrates a block diagram of a multimedia environment, according to some embodiments.

Traditionally, television (TV) offers viewers access to content distributed via cable or satellite services or through over-the-air broadcasts. Over-the-top television (OTT) refers to TV content distributed via the internet in a live streaming format without the involvement of cable or satellite service providers. A viewer can be referred to as an end-user or a user. In general, to deliver and present content to end-users, a content provider can transmit the content to one or more content distribution systems, such as the Internet, cable or satellite services, each of which can in turn transmit the content to one or more respective content presentation devices or media devices to be output for presentation to respective end-users through display devices. Such a hierarchical arrangement can facilitate convenient, widespread distribution of content.

By way of example, in order for a video content provider to deliver video content to end-users throughout the United States, the video content provider can transmit the video content by satellite or another medium to content distribution systems that serve respective designated market areas (DMAs) within the United States. Each such content distribution system can therefore receive the national satellite feed carrying the video content and can transmit the video content to television sets and/or set-top boxes in the content distribution system's DMA, such that the video content can be output for presentation at display devices to respective end-users in that DMA. In practice, these content distribution systems and their means of transmission to content presentation devices can take various forms. For instance, a content distribution system can be associated with a cable-television provider and can transmit video content to content presentation devices for presentation on display devices of end-users who are cable-television subscribers through hybrid fiber/coaxial cable connections. A content presentation device can be referred to as a media device or a computing device.

As such, in various scenarios, a content distribution system can transmit content to a content presentation device, which can receive and output the content for presentation at a display device to an end-user. In some situations, even though the content presentation device receives content from the content distribution system, it can be desirable for the content presentation device to perform a content modification operation so that the content presentation device can output to the display device for presentation alternative content instead of at least a portion of that received content.

For example, in the case where the content presentation device receives a linear sequence of content segments that includes a given advertisement segment positioned somewhere within the sequence, it can be desirable for the content presentation device to replace the given advertisement segment with a different advertisement segment that is perhaps more targeted to the end-user (e.g., more targeted to the end-user's interests, demographics, etc.). As another example, it can be desirable for the content presentation device to overlay on the given advertisement segment, overlay content that enhances the given advertisement segment in a way that is again perhaps more targeted to the end-user. The described content modification system can facilitate providing these and other related features.

In one example, the content modification system can include a fingerprint matching server that can identify an upcoming content modification opportunity on an identified channel, which it can do by comparing and detecting a match between two different instances of fingerprint data. Based on the detected match, the fingerprint matching server can then transmit fingerprint data and metadata to the content presentation device to facilitate preparing the content presentation device to perform a content modification operation in connection with the identified upcoming content modification opportunity.

However, in other cases, it may be desirable for the content presentation device to use one or more alternative techniques to facilitate performing a content modification operation.

For example, the fingerprint matching server can use broadcast-schedule data to facilitate the content presentation device performing a content modification operation. Among other things, this can allow the content presentation device to facilitate performing a content modification operation without using fingerprint data or by using fingerprint data in a more limited fashion. This can be beneficial in the case where the content presentation device does not receive or otherwise have access to fingerprint data, or where the use of fingerprint data is undesirable for one or more reasons (e.g., because fingerprint-based techniques may be computationally expensive).

For dynamic advertisement insertion (DAI), when a content presentation device receives a linear sequence of content segments that includes an original advertisement segment positioned somewhere within the sequence, the content presentation device can replace the original advertisement segment with a replacement advertisement segment that is perhaps more targeted to the end-user. It is desirable to start the replacement advertisement segment without showing any video frames or sound of the original advertisement segment of the linear sequence of content segments. However, due to varying conditions of the network, it may be hard to predict and manage the exact time when a replacement advertisement segment is available to replace the original advertisement segment. If a video frame or sound of the original advertisement segment is shown before or after showing the replacement advertisement segment, the user may have a poor user experience.

Embodiments herein present mechanisms to manage the content replacement in a content modification system. Techniques presented herein can be applicable to DAI that allows advertisers using a content modification system to swap out advertisements in a linear sequence of content segments of linear, live, video-on-demand, or streaming content. The linear sequence of content segments can include a first segment having an ending frame adjacent to a start frame of a second segment of the linear sequence of content segments, where the second segment can be the original advertisement segment to be replaced by the replacement segment. Based on a determination that the replacement segment is unavailable, a controller of a content presentation device or a media device can provide one or more additional copies of the ending frame of the first segment to a display device while the replacement segment to replace the second segment is unavailable. By showing the one or more additional copies of the ending frame of the first segment before the original advertisement segment to be replaced, no video frames or sound of the original advertisement segment can be shown before the replacement segment is available. On the other hand, the additional copies of the ending frame of the first segment merely continue what has been presented to the users without drawing the users attentions. Hence, the user experience can be improved.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to multimedia environment 102, as will be appreciated by persons skilled in the relevant art(s) based on the teachings contained herein. An example of multimedia environment 102 shall now be described.

Multimedia Environment

FIG. 1 illustrates a block diagram of multimedia environment 102, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to multimedia environment 102 of FIG. 1, as will be appreciated by persons skilled in the relevant art(s) based on the teachings contained herein.

In a non-limiting example, multimedia environment 102 may be directed to streaming media. However, this disclosure is applicable to any type of media (instead of or in addition to streaming media), such as linear TV program, OTT program, as well as any mechanism, means, protocol, method and/or process for distributing media.

Multimedia environment 102 may include one or more media systems 104. Media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a content presentation device, a streaming media device, a streaming set-top box (STB), cable and satellite STB, a DVD or BLU-RAY device, an audio/video playback device, ca able box, and/or a digital video recording device, to name just a few examples. Display device 108 may be a monitor, a television (TV), a computer, a computer monitor, a smart phone, a tablet, a wearable (such as a watch or glasses), an appliance, an internet of things (IoT) device, and/or a projector, to name just a few examples. In some embodiments, media device 106 can be a part of, integrated with, attached to, operatively coupled to, and/or connected to its respective display device 108. Media device 106, which may be referred to as a content presentation device, can provide multimedia content to display device 108.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as WiFi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106, display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106, display device 108, using cellular, Bluetooth, infrared, etc., or any combination thereof.

Multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 may also or alternatively include links to any such information pertaining or relating to content 122. Metadata 124 may also or alternatively include one or more indexes of content 122, such as but not limited to a trick mode index.

Multimedia environment 102 may include one or more system servers 126. System servers 126 may operate to support media device 106 from the cloud. It is noted that the structural and functional aspects of system servers 126 may wholly or partially exist in the same or different ones of system servers 126.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems 104, crowdsource server(s) 128 may identify similarities and overlaps between closed captioning requests issued by different users 132 watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streaming of the movie.

System servers 126 may also include an audio command processing module 130. As noted above, remote control 110 may include a microphone 112. Microphone 112 may receive audio data from user 132 (as well as other sources, such as display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which is then forwarded to audio command processing module 130 in system servers 126. Audio command processing module 130 may operate to process and analyze the received audio data to recognize a verbal command from user 132. Audio command processing module 130 may then forward the verbal command back to media device 106 for processing.

In some embodiments, the audio data may be alternatively or additionally processed and analyzed by an audio command processing module in media device 106. Media device 106 and system servers 126 may then cooperate to pick one of the verbal commands to process (either the verbal command recognized by audio command processing module 130 in system servers 126, or the verbal command recognized by audio command processing module in media device 106).

Figure 3:
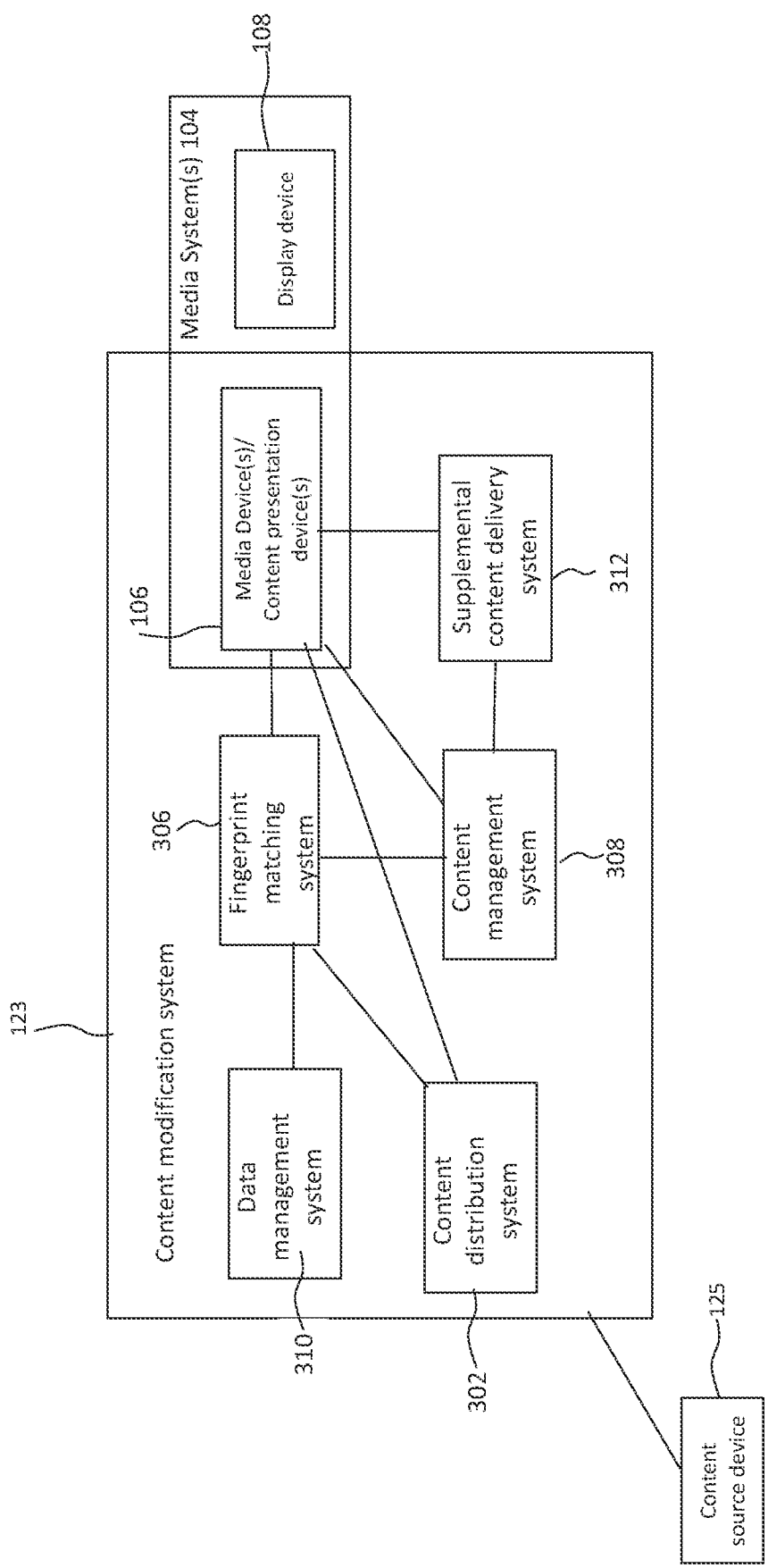
FIG. 3 illustrates a simplified block diagram of an example content modification system in which various described principles can be implemented, according to some embodiments.

Multimedia environment 102 may include a content modification system 123 coupled to a content source device 125. As shown in FIG. 3, the content modification system 123 can include various components, such as a content distribution system 302, a fingerprint matching server 306, a content management system 308, a data management system 310, and/or a supplemental content delivery system 312. In some embodiments, content modification system 123 can include a content presentation device, which may be implemented as a part of media device 106. In some other embodiments, functions described herein for the content presentation device in relation with content modification system 123 can be implemented by a content presentation device independent from media device 106.

In some embodiments, content modification system 123 can also include one or more connection mechanisms that connect various components within content modification system 123. For example, content modification system 123 can include the connection mechanisms represented by lines connecting components of content modification system 123, as shown FIG. 2.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

Content modification system 123 and/or components thereof can take the form of a computing system, an example of which is described below.

Notably, in practice, content modification system 123 is likely to include many instances of at least some of the described components. For example, content modification system 123 is likely to include many content distribution systems and many content presentation devices.

Figure 2:
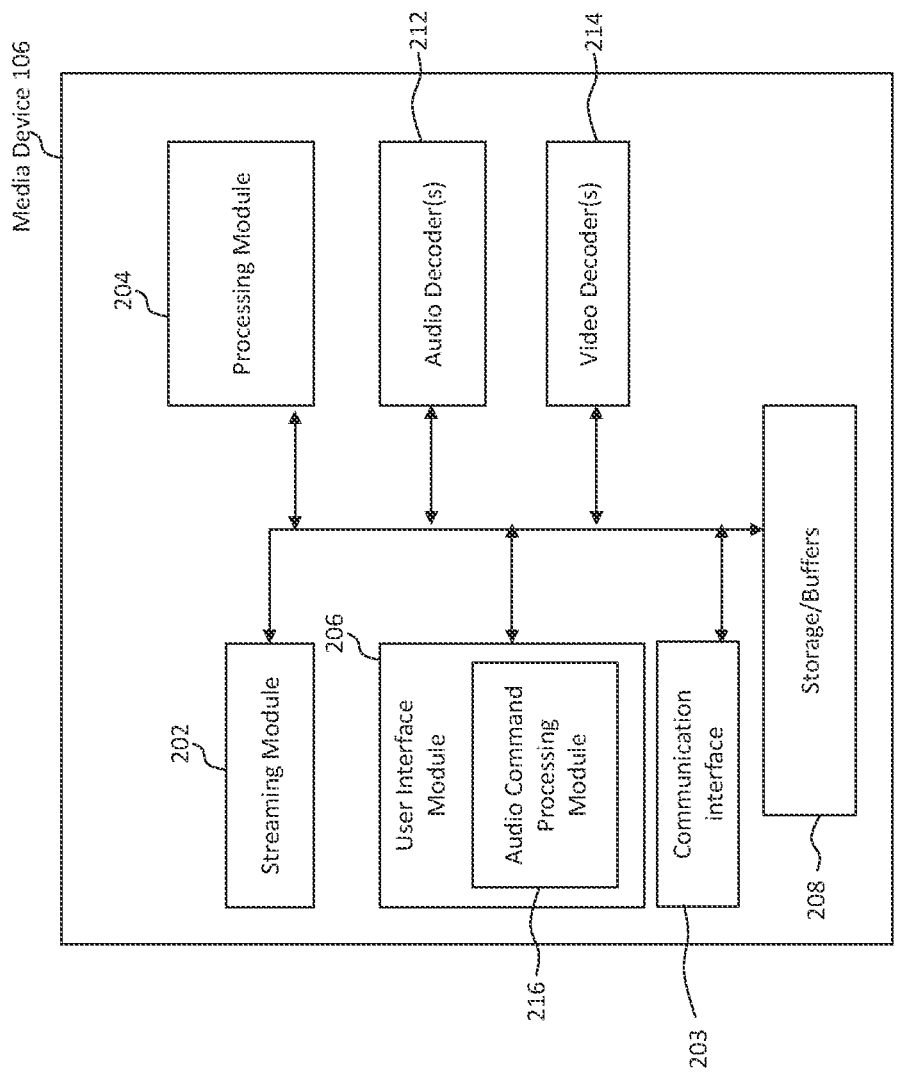
FIG. 2 illustrates a simplified block diagram of an example computing system in which various described principles can be implemented, according to some embodiments.

FIG. 2 illustrates a block diagram of an example media device 106, according to some embodiments. Media device 106 may include a streaming module 202, a processing module 204, a storage/buffers 208, and a user interface module 206. As described above, user interface module 206 may include audio command processing module 216. Media device 106 may also include a communication interface 203.

In some embodiments, media device 106 can take the form of a desktop computer, a laptop, a tablet, a mobile phone, a television set, a set-top box, a television set with an integrated set-top box, a media dongle, or a television set with a media dongle connected to it, among other possibilities.

Processing module 204 can be or include a general-purpose processor (e.g., a microprocessor) and/or a special-purpose processor (e.g., a digital signal processor). Processing module 204 can execute program instructions included in storage/buffers 208 as described below.

Storage/buffers 208 can be or include one or more volatile, non-volatile, removable, and/or non-removable storage components, such as magnetic, optical, and/or flash storage, and/or can be integrated in whole or in part with processing module 204. Further, storage/buffers 208 can be or include a non-transitory computer-readable storage medium, having stored thereon program instructions (e.g., compiled or non-compiled program logic and/or machine code) that, upon execution by processing module 204, cause media device 106 and/or another computing system to perform one or more operations, such as the operations described in this disclosure. These program instructions can define, and/or be part of, a discrete software application.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OPla, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

In some instances, media device 106 can execute program instructions in response to receiving an input, such as an input received via communication interface 203 and/or user interface module 206. Storage/buffers 208 can also store other data, such as any of the data described in this disclosure.

Communication interface 203 can allow media device 106 to connect with and/or communicate with another entity according to one or more protocols. Therefore, media device 106 can transmit data to, and/or receive data from, one or more other entities according to one or more protocols. In one example, communication interface 203 can be or include a wired interface, such as an Ethernet interface or a High-Definition Multimedia Interface (HDMI). In another example, the communication interface 206 can be or include a wireless interface, such as a cellular or WI-FI interface.

User interface module 206 can allow for interaction between media device 106 and a user of media device 106. As such, user interface module 206 can be or include an input component such as a keyboard, a mouse, a remote controller, a microphone, and/or a touch-sensitive panel.

User interface module 206 can also be or include an output component such as a display device (which, for example, can be combined with a touch-sensitive panel) and/or a sound speaker.

Media device 106 can also include one or more connection mechanisms that connect various components within media device 106. For example, media device 106 can include the connection mechanisms represented by lines that connect components of media device 106, as shown in FIG. 2.

Media device 106 can include one or more of the above-described components and can be configured or arranged in various ways. For example, media device 106 can be configured as a server and/or a client (or perhaps a cluster of servers and/or a cluster of clients) operating in one or more server-client type arrangements, for instance.

Now referring to both FIGS. 1 and 2, in some embodiments, user 132 may interact with media device 106 via, for example, remote control 110. For example, user 132 may use remote control 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to display device 108 for playback to user 132.

In streaming embodiments, streaming module 202 may transmit the content to display device 108 in real time or near real time as it receives such content from content server(s) 120. In non-streaming embodiments, media device 106 may store the content received from content server(s) 120 in storage/buffers 208 for later playback on display device 108.

FIG. 3 illustrates a simplified block diagram of content modification system 123 in which various described principles can be implemented, according to some embodiments.

Content modification system 123 and/or components thereof can be configured to perform and/or can perform one or more operations. Examples of these operations and related features will now be described.

As noted above, in practice, content modification system 123 is likely to include many instances of at least some of the described components. Likewise, in practice, it is likely that at least some of described operations will be performed many times (perhaps on a routine basis and/or in connection with additional instances of the described components).

For context, general operations and examples related to content distribution system 302 transmitting content and media device 106 to function as a content presentation device for receiving and outputting content will now be described.

To begin, content distribution system 302 can transmit content (e.g., that it received from a content provider) to one or more entities such as media device 106 to function as a content presentation device. Content can be or include audio content and/or video content, for example. In some examples, content can take the form of a linear sequence of content segments (e.g., program segments and advertisement segments) or a portion thereof. In the case of video content, a portion of the video content may be one or more frames, for example.

Content distribution system 302 can transmit content on one or more channels (sometimes referred to as stations or feeds). As such, the content distribution system 302 can be associated with a single channel content distributor or a multi-channel content distributor such as a multi-channel video program distributor (MVPD).

Content distribution system 302 and its means of transmission of content on the channel to media device 106 functioning as a content presentation device can take various forms. By way of example, content distribution system 302 can be or include a cable-television head-end that is associated with a cable-television provider and that transmits the content on the channel to media device 106 functioning as a content presentation device through hybrid fiber/coaxial cable connections. As another example, content distribution system 302 can be or include a satellite-television head-end that is associated with a satellite-television provider and that transmits the content on the channel to media device 106 through a satellite transmission. As yet another example, content distribution system 302 can be or include a television-broadcast station that is associated with a television-broadcast provider and that transmits the content on the channel through a terrestrial over-the-air interface to media device 106. In these and other examples, content distribution system 302 can transmit the content in the form of an analog or digital broadcast stream representing the content.

To function as a content presentation device, media device 106 can receive content from one or more entities, such as content distribution system 302. In one example, media device 106 can select (e.g., by tuning to) a channel from among multiple available channels, perhaps based on input received via a user interface, such that media device 106 can receive content on the selected channel.

Figure 4:
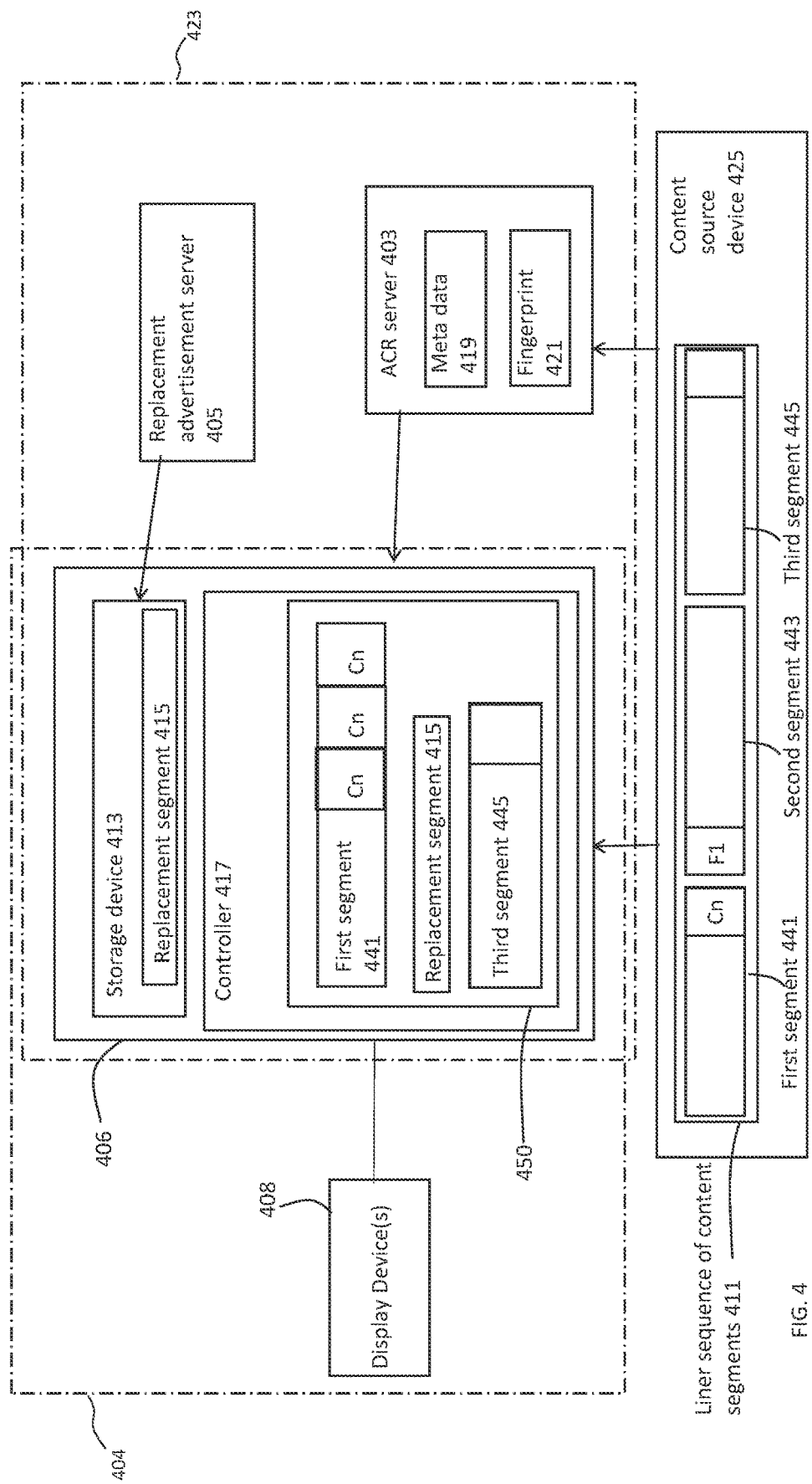
FIG. 4 illustrates a simplified block diagram of an example content modification system in which various described principles can be implemented, according to some embodiments.

In some examples, content distribution system 302 can transmit content to media device 106, which media device 106 can receive, and therefore the transmitted content and the received content can be the same. However, in other examples, they can be different, such as where content distribution system 302 transmits content to media device 106, but media device 106 does not receive the content and instead receives different content from a different content distribution system. Additionally and alternatively, media device 106 may receive the content and make changes to the received contents with other contents, such as contents received from supplement content delivery system 312. More example details of such modification are shown in FIG. 4.

Media device 106 can also output content for presentation at display device 108. As noted above, media device 106 can take various forms. In one example, in the case where media device 106 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where media device 106 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, content distribution system 302 can transmit content to media device 106, which can receive and output the content to display device 108 for presentation to an end-user. In some situations, even though media device 106 receives content from content distribution system 302, it can be desirable for media device 106 to perform a content modification operation so that media device 106 can output for presentation alternative content instead of at least a portion of that received content.

For example, in the case where media device 106 receives a linear sequence of content segments that includes a given advertisement segment positioned somewhere within the sequence, it can be desirable for media device 106 to replace the given advertisement segment with a replacement advertisement segment that is perhaps more targeted to the end-user (i.e., more targeted to the end-user's interests, demographics, etc.). The replacement advertisement segment can be received from supplement content delivery system 312. As another example, it can be desirable for media device 106 to overlay on the given advertisement segment, overlay content that enhances the given advertisement segment in a way that is again perhaps more targeted to the end-user. The described content modification system 123 can facilitate providing these and other related features.

As noted above, in one example, content can take the form of a linear sequence of content segments. As such, in one example, content distribution system 302 can transmit a linear sequence of content segments. This is referred to herein as a "transmission sequence." Likewise, media device 106 can receive a linear sequence of content segments. This is referred to herein as a "receipt sequence." In line with the discussion above, the transmission sequence and the receipt sequence can be the same or they can be different.

FIG. 4 illustrates a simplified block diagram of an example content modification system 423 in which various described principles can be implemented, according to some embodiments. Content modification system 423 can be an example of content modification system 123.

In some embodiments, content modification system 423 can include a media device 406 performing functions of a content-presentation device, an automatic content recognition (ACR) server 403 performing functions of fingerprint matching server 306, and a replacement advertisement server 405 performing functions of supplemental content delivery system 312. Other components of content modification system 423, such as a content distribution system, a data management system, are not shown explicitly. Content modification system 423 is coupled to content source device 425, where content modification system 423 and content source device 425 are examples of content modification system 123 and content source device 125 as shown in FIG. 1.

In some embodiments, a media system 404 includes media device 406 and display device 408, which can be examples of media system 104 including media device 106, and display device 108 as shown in FIG. 1. In some embodiments, media device 406 can be an ACR enabled streaming media device, or STB, and display device 408 can be an ACR enabled display device. As shown in FIG. 4, media device 406 is included in both media system 404 and content modification system 423. In some other embodiments, functions of media device 406 can be separately implemented into multiple components so that functions related to a content-presentation device are implemented in a component included in content modification system 423. In some embodiments, media device 406 may be referred to as a primary device, and display device 108 may be referred to as a secondary device. Media device 406 and display device 408 may be coupled together by various means, such as by a HDMI cable. In some embodiments, media device 406 and display device 408 may be integrated together as one component.

In some embodiments, content source device 425 can provide a linear sequence of content segments 411 to media device 406 through a content distribution system (not shown). The linear sequence of content segments 411 is the "transmission sequence," and can be a streaming media program on a channel, or any content delivered as a linear TV program, an over-the-top television (OTT) program, or other streaming content. The linear sequence of content segments 411 can include a first segment 441, a second segment 443, a third segment 445, and other additional segments not shown. The first segment 441 can include a plurality of frames, with an ending frame Cn, while the second segment 443 can include a plurality of frames, with a start frame F1, where frame Cn is adjacent to frame F1. The third segment 445 may be a subsequent segment adjacent to and after the second segment 443.

In some embodiments, each segment, such as the first segment 441 and the second segment 443, can include the same number of frames. In some other embodiments, different segments can have different number of frames. In some embodiments, the second segment 443 can be an original advertisement segment, which can be replaced by a replacement segment 415 that is a replacement advertisement segment. In some embodiments, replacement segment 415 can be received from advertisement server 405 and stored in a storage device 413 of media device 406. Replacement segment 415 is to replace the second segment 443 of the linear sequence of content segments 411 to be supplied to display device 408.

In some embodiments, media device 406 can include storage device 413 storing replacement segment 415 and a controller 417 coupled to the storage device 413. Controller 417 can be configured to perform various operations described below.

In some embodiments, controller 417 can receive the linear sequence of content segments 411 from content source device 425 through a content distribution system, where the linear sequence of content segments 411 can be a transmission sequence. After receiving the linear sequence of content segments 411, controller 417 can assemble a sequence of content segments 450, which can be a receipt sequence, to be supplied to a display device, e.g., display device 408. Some segments of the sequence of content segments 450 can be different from the linear sequence of content segments 411 received from content source device 425. For example, the sequence of content segments 450 can include the first segment 441 to be supplied to display device 408. Afterwards, instead of having the second segment 443, the sequence of content segments 450 can include replacement segment 415 that is received from advertisement server 405 and stored in storage device 413. In some embodiments, controller 417 can be configured to detect that the second segment 443 is to be replaced by replacement segment 415. In some embodiments, the second segment 443 is an original advertisement segment, and replacement segment 415 can be a replacement advertisement segment received from advertisement server 405.

In some embodiments, controller 417 can detect that the second segment 443 is to be replaced by the replacement segment 415 based on metadata 419 generated by ACR server 403 associated with the linear sequence of content segments 441. Content source device 425 can supply the linear sequence of content segments 411 to media device 406 as well as ACR server 403 at the same time. ACR server 403 can generate metadata 419 associated with the linear sequence of content segments 411, and can further perform and generate fingerprint 421 of the linear sequence of content segments 411.

In some embodiments, after having detected that the second segment 443 is to be replaced by replacement segment 415, controller 417 can detect whether or not replacement segment 415 is available in storage device 413 to replace the second segment 443. Due to the various network connections between media device 406 and advertisement server 405, replacement segment 415 may not be available at storage device 413 when it is the time for providing the second segment 443 to display device 408. Based on a determination that replacement segment 415 is unavailable, controller 417 can be configured to provide one or more additional copies of the ending frame Cn of the first segment 441 to display device 408 while replacement segment 415 to replace the second segment is unavailable. As shown in FIG. 4, two additional copies of the ending frame Cn of the first segment 441 are supplied to display device 408. User can watch the additional copies of the ending frame Cn of the first segment 441, which can create an impression that the first segment 441 continues while media device 406 is waiting for replacement segment 415. Therefore, no frame or sound of the second segment 443 is shown while waiting for replacement segment 415, resulting in an improved user experience. While controller 417 of media device 406 is providing the one or more additional copies of the ending frame Cn of the first segment 441 to display device 408, ACR server 403 can perform fingerprint of the linear sequence of content segments 411 to generate fingerprint 421.

In some embodiments, controller 417 can be configured to provide the one or more additional copies of the ending frame Cn to display device 408 until a determination that replacement segment 415 is available. Once replacement segment 415 becomes available, controller 417 can be configured to provide replacement segment 415 to display device 408.

In some embodiments, controller 417 can be further configured to provide the third segment 445 to display device 408 after providing replacement segment 415 to display device 408. In some embodiments, upon a determination that replacement segment 415 is not available after a predetermined time period, controller 417 can be configured to provide a segment of the linear sequence of content segments 411 to display device 408, wherein the segment is separated from the first segment 441 by the predetermined time period.

Figure 5:
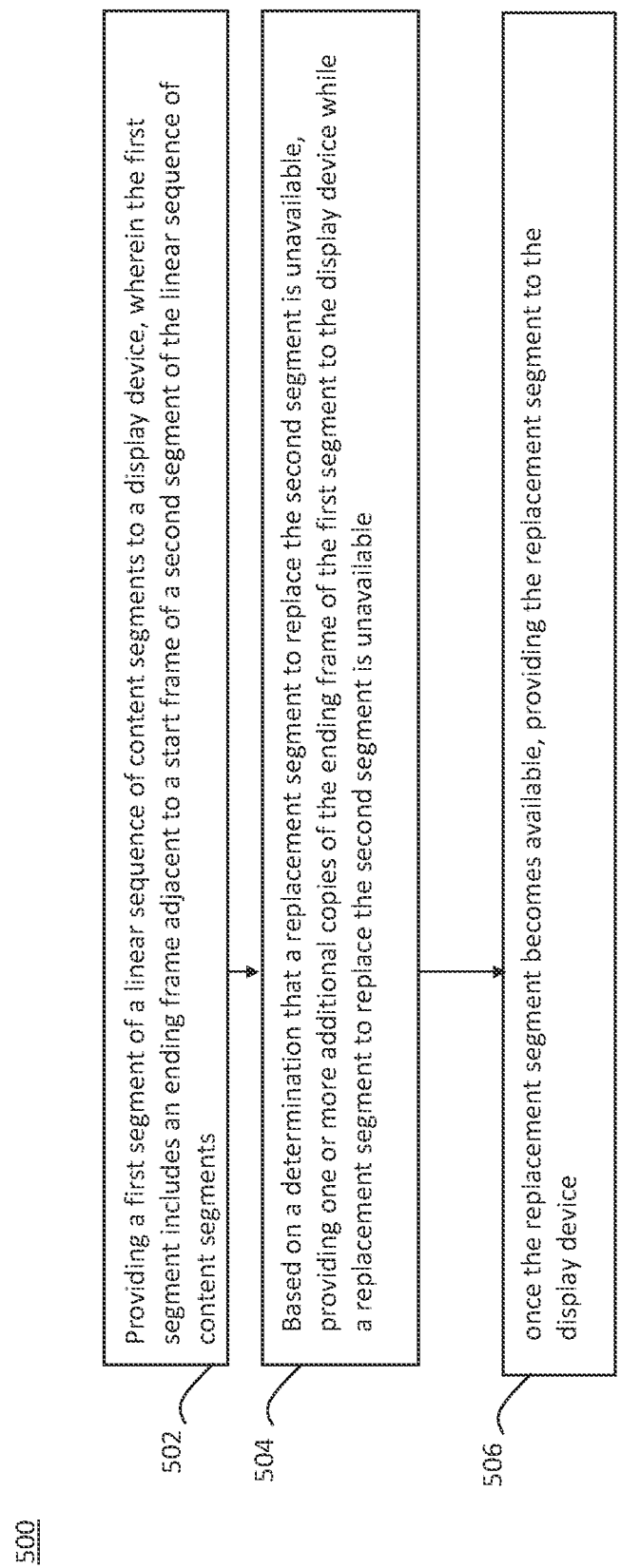
FIG. 5 illustrates an example process performed by a content modification system, according to some embodiments.

FIG. 5 illustrates an example process 500 performed by a content modification system, according to some embodiments. FIG. 5 illustrates process 500 performed by content modification system 423 or content modification system 123, according to some embodiments. Processes 500 can be performed by processing logic that can comprise hardware (e.g., circuitry, dedicated logic, programmable logic, microcode, etc.), software (e.g., instructions executing on a processing device, such as by controller 417), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

At 502, controller 417 can provide a first segment of a linear sequence of content segments to a display device, where the first segment includes an ending frame adjacent to a start frame of a second segment of the linear sequence of content segments. For example, as described for FIG. 4, controller 417 can provide the first segment 441 of the linear sequence of content segments 411 to display device 408, where the first segment 441 includes the ending frame Cn adjacent to the start frame F1 of the second segment 443 of the linear sequence of content segments 411.

At 504, based on a determination that a replacement segment to replace the second segment is unavailable, controller 417 can provide one or more additional copies of the ending frame of the first segment to the display device while a replacement segment to replace the second segment is unavailable. For example, as described for FIG. 4, controller 417 can determine that replacement segment 415 to replace the second segment 443 is unavailable. Based on the determination, controller 417 can provide one or more additional copies of the ending frame Cn of the first segment 441 to display device 408 while a replacement segment to replace the second segment is unavailable.

At 506, once the replacement segment becomes available, controller 417 can provide the replacement segment to the display device. For example, as described for FIG. 4, controller 417 can determine whether replacement segment 415 becomes available. Controller 417 can perform such a determination periodically, or waiting for an alert from storage device 413 to inform controller 417 that replacement segment 415 becomes available. Once the replacement segment becomes available, controller 417 can provide replacement segment 415 to display device 408.

There can be other operations performed by controller 417, which are not shown in process 500. For example, controller 417 can provide third segment 445 to display device 408 after providing replacement segment 415 to display device 408, detect that the second segment 443 is to be replaced by replacement segment 415 before detecting whether replacement segment 415 is available to replace the second segment 443, and many other operations as described above.

Example Computer System

Figure 6:
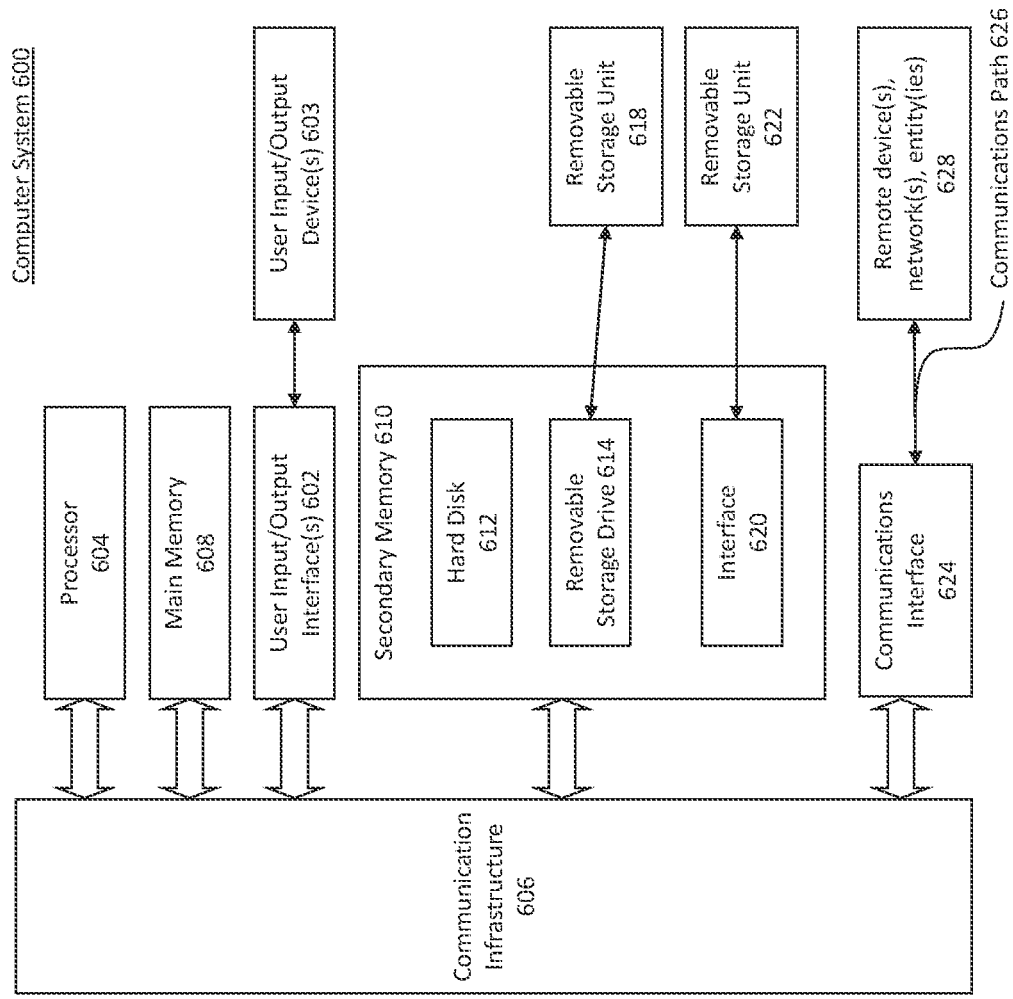
FIG. 6 illustrates an example computer system useful for implementing various embodiments.

Various embodiments may be implemented, for example, using one or more well-known computer systems, such as computer system 600 shown in FIG. 6. For example, media device 106, display device 108, devices within content modification system 123, or content source device 125, media device 406, display device 408, ACR server 403, replacement advertisement server 405, or content source device 425 may be implemented using combinations or sub-combinations of computer system 600 to perform various functions described herein, e.g., by process 500. Additionally or alternatively, one or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600 or processor(s) 604), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
  receiving, by a media device from a content source device, a first segment of a linear sequence of content segments, wherein the first segment includes an ending frame adjacent to a start frame of a second segment of the linear sequence of content segments;
  providing, by the media device, the first segment to a display device;
  based on a determination that a replacement segment to replace the second segment is unavailable in a storage device of the media device, further providing one or more additional copies of the ending frame of the first segment to the display device so that no frame of the second segment is provided to the display device while waiting for the replacement segment to be fetched from a network server and become available in the storage device; and
  once the replacement segment becomes available in the storage device, providing the replacement segment to the display device so that the first segment, one or more additional copies of the ending frame of the first segment, and the replacement segment are provided in a sequence without frames of the second segment to the display device.

2. The method of claim 1, wherein the linear sequence of content segments comprises a subsequent segment adjacent to and after the second segment; and the method further comprises:
  providing the subsequent segment to the display device after providing the replacement segment to the display device.

3. The method of claim 1, wherein the second segment is an original advertisement segment, and the replacement segment is a replacement advertisement segment received from an advertisement server and stored in a memory.

4. The method of claim 1, further comprising:
  detecting that the second segment is to be replaced by the replacement segment before detecting whether the replacement segment is available to replace the second segment.

5. The method of claim 4, wherein the detecting that the second segment is to be replaced by the replacement segment comprises detecting that the second segment is to be replaced by the replacement segment based on metadata associated with the linear sequence of content segments generated by an automatic content recognition (ACR) server.

6. The method of claim 5, further comprising:
  performing a fingerprint of the linear sequence of content segments generated by the ACR server while providing the one or more additional copies of the ending frame of the first segment to the display device.

7. The method of claim 1, wherein the linear sequence of content segments comprises a streaming media program on a channel.

8. The method of claim 1, wherein providing the one or more additional copies of the ending frame of the first segment to the display device comprises:
  providing the one or more additional copies of the ending frame to the display device until a determination that the replacement segment is available.

9. The method of claim 1, further comprising:
  upon a determination that the replacement segment is not available after a predetermined time period, providing a subsequent segment of the linear sequence of content segments to the display device, wherein the subsequent segment is separated from the first segment by the predetermined time period.

10. A computing device, comprising:
  a storage device to store a replacement segment; and
  at least one controller coupled to the storage device and configured to:
    receive, from a content source device, a first segment of a linear sequence of content segments, wherein the first segment includes an ending frame adjacent to a start frame of a second segment of the linear sequence of content segments;
    provide the first segment to a display device;
    based on a determination that the replacement segment to replace the second segment is unavailable in the storage device, provide one or more additional copies of the ending frame of the first segment to the display device so that no frame of the second segment is provided to the display device while waiting for the replacement segment to be fetched from a network server and become available in the storage device; and
    once the replacement segment becomes available in the storage device, provide the replacement segment to the display device so that the first segment, one or more additional copies of the ending frame of the first segment, and the replacement segment are provided in a sequence without frames of the second segment to the display device.

11. The computing device of claim 10, wherein the linear sequence of content segments comprises a subsequent segment adjacent to and after the second segment; and the controller is further configured to:
  provide the subsequent segment to the display device after providing the replacement segment to the display device.

12. The computing device of claim 10, wherein the second segment is an original advertisement segment, and the replacement segment is a replacement advertisement segment received from an advertisement server and stored in the storage device.

13. The computing device of claim 10, wherein the at least one controller is further configured to:
  detect that the second segment is to be replaced by the replacement segment before detecting whether the replacement segment is available in the storage device to replace the second segment.

14. The computing device of claim 10, wherein the linear sequence of content segments comprises a streaming media program on a channel.

15. The computing device of claim 10, wherein the at least one controller is further configured to:
provide the one or more additional copies of the ending frame to the display device until a determination that the replacement segment is available.

16. The computing device of claim 10, wherein the at least one controller is further configured to:
upon a determination that the replacement segment is not available after a predetermined time period, provide a segment of the linear sequence of content segments to the display device, wherein the segment is separated from the first segment by the predetermined time period.

17. A non-transitory computer-readable medium having instructions stored thereon that, when executed by at least a computing device, cause the computing device to perform operations comprising:
receiving, from a content source device, a first segment of a linear sequence of content segments, wherein the first segment includes an ending frame adjacent to a start frame of a second segment of the linear sequence of content segments;
providing the first segment to a display device;
based on a determination that a replacement segment to replace the second segment is unavailable in a storage device of the computing device, further providing one or more additional copies of the ending frame of the first segment to the display device so that no frame of the second segment is provided to the display device while waiting for the replacement segment to be fetched from a network server and become available in the storage device; and
once the replacement segment becomes available in the storage device, providing the replacement segment to the display device so that the first segment, one or more additional copies of the ending frame of the first segment, and the replacement segment are provided in a sequence without frames of the second segment to the display device.

18. The non-transitory computer-readable medium of claim 17, wherein the linear sequence of content segments comprises a subsequent segment adjacent to and after the second segment; and the operations further comprise:
providing the subsequent segment to the display device after providing the replacement segment to the display device.

19. The non-transitory computer-readable medium of claim 17, wherein the second segment is an original advertisement segment, and the replacement segment is a replacement advertisement segment received from an advertisement server.

20. The non-transitory computer-readable medium of claim 17, wherein the operations further comprise:
providing the one or more additional copies of the ending frame to the display device until a determination that the replacement segment is available.

* * * * *